Oct. 18, 1938.  B. HOPPER ET AL  2,133,618
METHOD FOR OPERATING DEWAXING SYSTEMS
Filed March 25, 1935
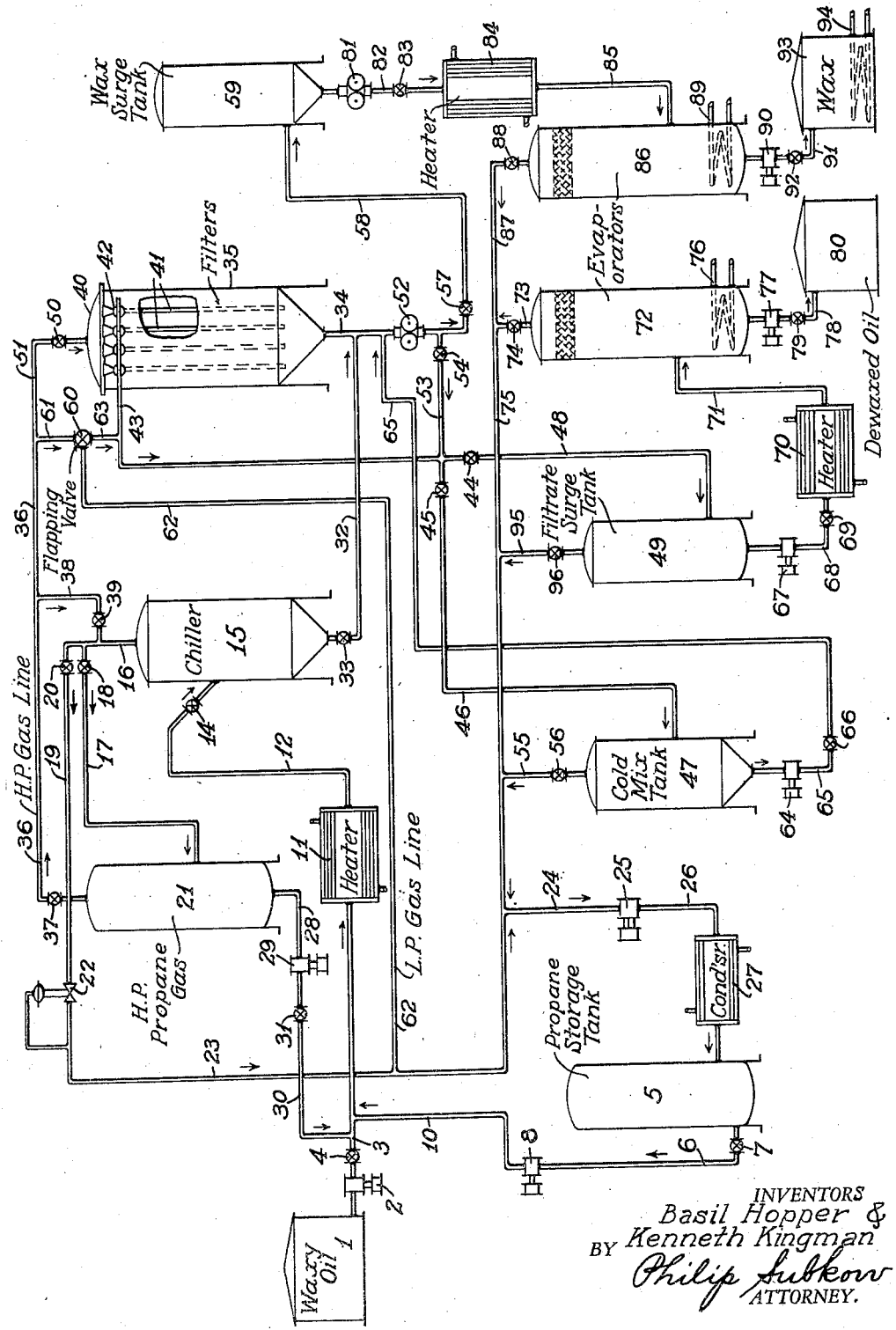
INVENTORS
Basil Hopper &
Kenneth Kingman
BY Philip Subkow
ATTORNEY.

Patented Oct. 18, 1938

2,133,618

UNITED STATES PATENT OFFICE 2,133,618

METHOD FOR OPERATING DEWAXING SYSTEMS

Basil Hopper and Kenneth Kingman, Palos Verdes Estates, Calif., assignors to Union Oil Company of California, Los Angeles, Calif., a corporation of California Application March 25, 1935, Serial No. 12,771

4 Claims. (Cl. 196—18)

This invention relates to the separation of wax from oils and it relates more particularly to a system for separting wax from oils in an efficient and economical manner.

In a co-pending application, Patent 2,098,545, we have disclosed a process for dewaxing oil by first dissolving it in a light liquid hydrocarbon, preferably a liquefied normally gaseous hydrocarbon, such as propane, under pressure sufficient to maintain the propane liquid at the temperatures employed. The diluted waxy oil solution is then introduced into a chiller where crystallization of the wax is obtained by gradually vaporizing a portion of the hydrocarbon under gradually reduced pressure. By employing propane under pressure as the diluent-refrigerant, temperatures of approximately $-40°$ F. may be obtained by vaporizing propane by gradually releasing the pressure to atmospheric or below. At such temperatures, substantially all of the wax may be crystallized in the oil and remaining diluent.

The chilled slurry is then passed to a filter where the oil and solvent is forced through the canvas cloths of the filter leaves into a central chamber from which it is withdrawn while the wax accumulates as a wax cake upon the outer cloths of the filter leaves. When a sufficient quantity of wax has accumulated upon the filter leaves, the introduction of further quantities of oil is discontinued and filtration of the contents in the shell is continued until approximately one-third of the contents are filtered. The filter shell is then emptied of the unfiltered slurry and the latter is passed to another filter or to an auxiliary tank from which it may be returned to a filter. The wax cake on the filter cloths is then subjected to a blowing operation with propane gas for the purpose of removing oil and propane from the wax cake with a resultant drying thereof, after which the wax cake is removed from the cloths and filter shell.

The propane-gas vaporized from the chiller to effect refrigeration of the waxy oil is reliquefied by subjecting it to compression and cooling and is then returned to a storage tank for further use.

The chilled slurry in the chiller is preferably passed to the filters by imposing propane gas pressure taken from the top of the liquid propane storage tank in the chiller which forces it through connecting lines to the filter. Likewise, filtration of the unfiltered slurry remaining in the filter shell after the supply from the chiller is discontinued is accomplished by imposing gas pressure in the filter shell. The transfer of the mixture from one filter to another is also accomplished by gas pressure and finally the sloughing off of the wax cake is accomplished by alternately flexing and contracting the canvas cloths by the alternate application of high and low gas pressure. In all of these operations the high gas pressure is taken from the top of the propane storage tank and after serving its purpose, is reliquefied by compression and cooling and returned to the storage tank.

In a process employing a liquefied normally gaseous hydrocarbon as the diluent-refrigerant and the use of gaseous hydrocarbon under pressure for forcing the chilled slurry to the filters and for other purposes above mentioned, the cost of compression load, that is, the cost of reliquefying the propane gases by compression and condensation represents a material proportion of the cost of operating the entire system. Not only is this cost a considerable proportion of operation of the system but requires the use of large expensive compressors for recovering the gas. A system of this kind also necessitates provision of large storage capacity for the diluent-refrigerant.

It is an object of our invention to provide an improved system for dewaxing oils employing a liquefied normally gaseous hydrocarbon as a diluent-refrigerant in which the amount of recompression of the gases in the system is minimized and thus the cost of operating the dewaxing plant is greatly reduced.

A further object of our invention is to provide a system for dewaxing oils in which high pressure gas vaporized from the chillers or other units in the system is utilized in other parts of the system as, for example, for pressuring chilled slurry from the chillers to the filtering units or other wax separation units.

We have discovered that if the refrigeration cycle to crystallize out the wax from the diluted waxy oil is divided into two stages, that is, a high pressure stage and a low pressure stage, the propane gas or other gas used as the diluent-refrigerant evolved in the high pressure stage may be used to carry out some of the operations in the system when high pressure propane gas is used for this purpose and which is taken directly from the top of the liquefied propane storage tank. Thus, we have discovered that since pressure of the propane gas for pressuring the chilled slurry from the chillers to the filters, for flapping the leaves to slough off wax and for other purposes is necessarily considerably less than the upper pressure existing in the chiller at the start of the refrigeration, there exists a pressure range of propane gas in the refrigeration cycle which may be used to carry out the above mentioned operations. Thus, if the waxy oil is completely dissolved in liquid propane at a temperature of approximately 90 to 100° F., the solution entering the chiller and at the start of the refrigeration cycle will be approximately at a pressure of 200 to 215 lbs. per square inch. If the solution is chilled by gradually venting propane from the solution until a predetermined pressure of, say approximately 50 to 100 lbs. per square inch exists in the chiller, the propane gas vented from the chiller will be at a pressure varying from the upper limit of 200 to 215 lbs. to the lower predetermined pressure of 50 to 100 lbs. The high pressure gas may then be collected in a separate gas tank and used as needed or it may be used directly from the chiller undergoing high pressure chilling. Upon completion of the high pressure chilling stage, i. e. from 200 lbs. per square inch to the lower predetermined pressure, the propane gas vented from the mixture being chilled down to atmospheric pressure or below is recovered by compression and cooling and returned to the liquid propane storage tank. The lower predetermined pressure at which the high pressure chilling stage is stopped will depend, of course, upon the particular pressure desired or necessary to carry on the other operation in the system. We have mentioned 50 to 100 lbs. per square inch as comprising this pressure since we have found that pressures of approximately 50 lbs. per square inch have been found sufficient to transfer the chilled slurry from the chiller to the filters and for other usages herein mentioned. Also, the pressure at which the high pressure chilling is stopped will depend upon the quantity of high pressure gas necessary to carry on such other operations.

Thus, one of the features of our invention resides in conducting the refrigeration of the waxy oil and liquefied normally gaseous diluent under superatmospheric pressure by venting of gases in two stages, that is, a high pressure stage and a low pressure stage, the gases from the high pressure stage being collected separately without the aid of a compressor, while the gases vented from the low pressure stage being recovered by compression.

Another feature of our invention resides in using the gases from the high pressure chilling stage and which are above a predetermined superatmospheric pressure to effect transfer of the chilled mixture in a chiller to the filters.

A further feature of the invention resides in utilizing such high pressure gases for effecting filtration of the chilled mixture in the filter shells.

It is another feature of the invention to utilize such high pressure gases to pressure chilled mixture from one filter to another.

Another feature of the invention resides in utilizing such high pressure gases to blow oil and liquefied diluent from the wax cake accumulating on the filter leaves and also to slough off the wax cake from the filter leaves by subjecting the latter to the alternate application of high and low gas pressures.

Various other objects and features of our invention will become apparent to those skilled in the art from the following description of the invention taken from the drawing which represents a diagrammatic plan of a system adapted to carry out our invention.

Our invention will be described as used for the separation of wax from an S. A. E. 50 lubricating oil distillate produced from Santa Fe Springs crude petroleum. It should be understood, however, that the invention is equally applicable to the separation of wax from any wax bearing oils whether they comprise lubricating oil distillates or waxy petroleum residue.

In the description of our preferred embodiment, we will describe the use of commercial propane as a combined diluent and refrigerant. However, it should be understood that other liquefied normally gaseous hydrocarbons such as ethane, ethylene, propane, propylene, butane, isobutane, butylene, etc. may be used separately or in admixture with each other. Instead of using liquefied normally gaseous hydrocarbons, we may use other normally gaseous diluent-refrigerants such as methyl ether, methyl chloride, dichlor-difluor-methane. We may use in admixture with the foregoing normally gaseous diluent refrigerants normally liquid hydrocarbons such as gasoline, casinghead gasoline, naphtha, normally liquid anti-solvents for wax such as acetone, acid esters, mixtures of benzene with naphtha, etc. In our preferred embodiment, we effect practically complete separation of wax from oil by the use of commercial propane as the diluent refrigerant.

Referring to the drawing, the S. A. E. 50 waxy distillate produced from Santa Fe Springs crude oil is taken from tank 1 and pumped by pump 2 through line 3 controlled by valve 4 where it meets a stream of liquid propane under superatmospheric pressure sufficient to maintain the propane in the liquid state. This liquid propane is withdrawn from tank 5 via line 6 controlled by valve 7 and is pumped by pump 8 through line 10 into line 3 where it is mixed with the waxy oil. The mixture is then passed through heater 11 where the waxy oil is completely dissolved in the liquid propane. The mixture under a pressure of approximately 200 to 250 lbs. per square inch and at a temperature of 90 to 100° F. is passed through line 12 controlled by valve 14 into chiller 15 where the waxy oil and propane solution is gradually chilled to a temperature of —40° F. by gradually vaporizing a portion of the propane under reduced pressure through line 16. It will be observed at this point that the amount of propane initially mixed with the waxy oil will depend upon the character of the stock and the particular chilling procedures that are subsequently employed. We have effected adequate chilling to —45° F. with an initial ratio of 2.50 volumes of propane to one of the oil where make-up propane is injected into the chillers during evaporation of propane to compensate for the portion vaporized. If make-up propane is not used during the chilling cycle, the initial ratio of propane to oil should be approximately 4 to 6 volumes of propane to one of the oil.

The chilling cycle comprises a high pressure chilling at the start of the chilling cycle until a pressure is obtained in the chiller which is dependent upon the quantity of high pressure gas desired for other usages and a low pressure chilling which starts at the termination of the high pressure chilling down to the final chilling temperature by connection to the chilling compressors. For example, the initial mixture in chiller 15 under a pressure of about 200 lbs. per square inch may be chilled to 50° F. until a pressure of 75 lbs. per square inch is obtained in the chiller. This is accomplished by opening valve 18 on line 17, after which valve 18 is closed and valve 20 on line 19 is opened wherein the chiller is connected to the compressors and vaporization of propane is controlled by the action of the compressors. The propane vaporized during the high pressure portion of the chilling cycle is passed via line 16 into line 17 controlled by valve 18 into high pressure propane gas storage tank 21 until the pressures in chiller 15 and the storage tank 21 are in equilibrium, or until a predetermined pressure is reached in the chiller, after which valve 18 is closed and valve 20 on line 19 is opened wherein the propane vapors pass through pressure regulating valve 22 through lines 23 and 24 to compressor 25 which boosts the propane to the condensation pressure of the propane, i. e. about 200 lbs., after which the highly compressed propane is passed through line 26 to condenser 27 and thence returned to propane storage tank 5. Condensed propane and/or oil entrained in the propane vapors passing to storage tank 21 are withdrawn from the bottom of storage tank 21 via line 28 by pump 29 and passed through line 30 controlled by valve 31 into line 3 where it is mixed with the waxy oil and propane.

While I have disclosed the use of only one chiller in the system, it will be observed that any desired number of chillers may be used. With a large number of chillers, say five, the cycle of the chilling operation should be such that different phases of the chilling cycle occur in the several chillers at the same time, that is, while one of the chillers is being filled with oil-solvent solution, a second chiller is undergoing high pressure chilling, a third is undergoing low pressure chilling and a fourth is being emptied to filters or a filter surge tank, if one is employed, and a fifth is being warmed preparatory to filling with fresh solution. The latter operation is desirable in order to prevent shock chilling when the solution is introduced into it and this may be accomplished by passing a portion of the high pressure propane gas boiled from a filled chiller undergoing high pressure chilling into it until equilibrium between the two chillers is established. The condensed propane in the warmed chiller may be permitted to remain therein when this chiller is filled with fresh solution.

The slurry of chilled oil, remaining propane and crystallized wax at −40° F. at the completion of the chilling cycle is withdrawn from the chiller via line 32 controlled by valve 33 and is passed into line 34 into filters 35 where the precipitated wax is removed from the remaining oil and propane. The transfer of the chilled mixture from the chiller is accomplished by imposing gas pressure in the chiller and this is accomplished by passing high pressure propane gas from the top of storage tank 21 via line 36 controlled by valve 37 into line 38 controlled by valve 39.

The filters are preferably of the type disclosed by one of us in a co-pending application Serial No. 721,841, filed May 28th, 1934, and may comprise a vertical cylindrical filter tank or shell 35 provided with a tightly fitted removable cover 40. Supported in the body of the vertical cylindrical shell are a plurality of filter leaves 41 which are connected to outlets provided with valves 42, the outlets being connected to a discharge manifold 43. While we have disclosed only one filter, it will be observed that a plurality of filters may be employed which are preferably connected in parallel as to form one bank.

The introduction of chilled slurry from the chiller is continued until the shells are completely filled with the mixture, after which further introduction of chilled slurry under pressure will force the propane and oil through the canvas cloths of the filter leaves into the discharge manifold 43, the wax collecting on the canvas cloths. The pressure should be approximately 30 to 35 lbs. per square inch which is sufficient to transfer the cold slurry into the filters. Preferably, the initial filtration should be at as low a pressure as possible and the pressure in the chiller should be raised very slowly. The purpose for this is to lay down a good wax cake on the filtering elements at low pressure so that subsequent increase in pressure will not affect filter rates. If a high pressure differential is placed on the filters at first, practically no filter rates are obtained.

Since the initial filtrate may be cloudy, it is preferable to close valve 44 and open valve 45 and by-pass the cloudy filtrate via line 46 into cold mix tank 47. As soon as the sight glass on the filtrate discharge line 43 indicates that clear filtrate is being obtained, valve 45 is closed and valve 44 is opened and the clear filtrate is permitted to pass via line 48 into filtrate surge tank 49.

Filtration of the chilled mixture in the filters is continued until a wax cake of about one-half to one inch thick is built on the filter leaves at which time the flow of chilled mixture is stopped by closing valve 33 and the filtration is continued by opening valve 50 on line 51 to permit high pressure gas from 21 to force as much as possible of the slurry in the filters through the filter leaves. Generally, approximately one-third of the contents of the filter shells may be filtered in this manner.

The contents remaining in the filter shells are then transferred via line 34 and gear pump 52 through line 53 controlled by valve 54 into line 46 into cold mix tank 47. When the contents in the filter shells have been emptied to the cold mix tank, valve 54 is closed and the wax cake on the filtering elements is subjected to a blowing operation with propane gas for the purpose of removing as much oil and propane from the wax cake as possible. This is partially accomplished during the continued filtration described in the above paragraph by the introduction of propane gas under high pressure from tank 21 via lines 36 and 51 into the filter shells and continues during and after pumping out of the remaining mix in the filter shell. After the mix has been pumped out of the shell, the blowing is continued for approximately ten to twenty minutes which is sufficient to give the maximum degree of washing of the wax cake which will be effected by condensation of propane on the wax cake due to the high gas pressure existing in the chamber and the low temperature of the wax cake. Blowing pressures during this period are usually held at about 50 to 60 lbs. per square inch although higher or lower pressures may be used as desired. The filtrate passed through the filter leaves resulting by the blowing operation is generally cloudy and is, therefore, by-passed via line 46 to the cold mix tank. Propane gas will also pass to the cold mix tank and is removed via line 55 controlled by valve 56. The vaporization of propane under reduced pressure in the cold mix tank maintains a low temperature therein.

After drying the wax cake of oil and propane, the flow of propane gas into the filter shells is discontinued, after which valve 57 on line 58 is opened and the wax cake is sloughed off the filter leaves and passed by gear pump 52 through line 58 into wax surge tank 59. In order to accomplish removal of the wax cake from the filter leaves, a reversed flow of propane gas is resorted to. This is accomplished by means of a three-way valve 60 which is connected on one side by line 61 to the high gas pressure line 36 and on the other side by line 62 to low gas pressure or vacuum which may comprise the suction of compressor 25. High gas pressure and vacuum are then alternately exerted on the interior of the filter leaves operating through lines 63 and 43. The application of high pressure flexes the canvas cloths outwardly and the turning of the three-way cock to vacuum draws or contracts the canvas cloths. This alternate bulging and contraction otherwise known as "flapping" of the canvas cloths dislodges the wax cake from the filter cloths which drops to the bottom of the filter shell and is withdrawn via line 34 and pump 52 which forces the wax through line 58 to the wax surge tank 59.

The material collecting in cold mix tank 47 and maintained at a low temperature of —40° F. is periodically returned to the filters by pump 64, line 65, controlled by valve 66, and line 34. This is preferably accomplished after the filters have been filled with freshly chilled mixture from chiller 15. The mixture from the cold mix tank may then be worked behind the freshly chilled mixture without impairing filter rates.

The clear filtrate collecting in tank 49 may be withdrawn as desired by pump 67 and line 68 controlled by valve 69, heated in heater 70 and then passed through line 71 into evaporator 72 in which vaporized propane is withdrawn via line 73 controlled by valve 74 and passed into line 75 to compressor 25, condenser 27 and propane storage tank 5. Steam circulating through closed coil 76 aids in vaporizing propane from the dewaxed oil. The depropanized and dewaxed oil is withdrawn from the bottom of the evaporator by pump 77 and passed by line 78 controlled by valve 79 into dewaxed oil storage tank 80.

The wax is withdrawn from wax surge tank 59 by gear pump 81 and passed by line 82 controlled by valve 83 through heater 84 and line 85 into evaporator 86 where vaporized propane is withdrawn via line 87 controlled by valve 88 and returned to the propane storage tank as described above. Steam circulating through closed coil 89 aids in vaporizing propane from the wax. The depropanized wax is withdrawn from the bottom of the evaporator by pump 90 and is passed via line 91 controlled by valve 92 into wax storage tank 93 where it is maintained at a fluid temperature by steam circulating through closed coil 94.

If desired, high pressure propane gas vaporized from the filtrate and/or wax in evaporators 72 and/or 86 may also be passed into high pressure propane gas storage tank 21. However, since the temperature of this gas is substantially elevated, it may not be particularly desirable to employ this gas for the above mentioned uses.

Filtrate surge tank 49 is maintained at a low pressure by means of line 95 and valve 96 in order to permit flow of filtrate from the filter into the filter surge tank.

While we have disclosed the use of an auxiliary propane storage tank 21 to collect the high pressure propane gas from the chiller and from which the propane gas may be withdrawn as desired for the purpose of pressuring the chilled mixture from chiller 15 to the filters for filtering the contents in the filters, as explained above, and for flapping the filter leaves, it will be observed that the high pressure propane gas as it is taken off the chiller may be used directly for the foregoing purposes, that is, without first passing to tank 21 or only a portion of the high pressure gas may be stored as not needed at the moment. This is particularly true when a large number of chillers are employed and operated as described above and when a plurality of banks of filters are provided so that high pressure propane gas is continuously being produced from a chiller while freshly chilled mixture is continuously pressured to the filters and/or filtration is continued in the filters by gas pressure directly applied to the filters and/or wax is sloughed off the filters by the foregoing flapping procedure. However, it is preferable to pass the high pressure gas to the auxiliary storage tank prior to its use for the foregoing purposes since the gas may contain appreciable quantities of oil in the propane gas in which case the gas storage tank will serve as a trap for removing the oil fractions from the gas.

While we have described in more or less detail a preferred embodiment of our invention, it will be understood that this should not be considered as limiting as many variations may be made by those skilled in the art without departing from the spirit of the invention.

We claim:

1. A method for dewaxing wax-oil mixtures which comprises commingling a wax-oil mixture with a liquefied normally gaseous diluent under superatmospheric pressure, chilling said commingled wax-oil mixture and diluent by vaporizing a portion of the diluent in a high pressure range stage and a low pressure range stage, separately collecting the vaporized diluent from the high pressure range stage, utilizing the vaporized diluent from the high pressure range stage to transfer the chilled mixture of wax, oil and remaining diluent to a filter and filtering said chilled mixture to separate wax therefrom.

2. A method for dewaxing wax-oil mixtures which comprises commingling a wax-oil mixture with a liquefied normally gaseous diluent under superatmospheric pressure, chilling said commingled wax-oil mixture and diluent by vaporizing a portion of the diluent in a high pressure range stage and a low pressure range stage, separately collecting the vaporized diluent from the high pressure range stage, filtering the chilled mixture of wax, oil and remaining diluent under superatmospheric pressure to separate wax therefrom and utilizing said vaporized diluent from the high pressure range stage to provide said superatmospheric pressure in said filtration.

3. A method for dewaxing wax-oil mixtures which comprises commingling a wax-oil mixture with a liquefied normally gaseous diluent under superatmospheric pressure, chilling said commingled wax-oil mixture and diluent by vaporizing a portion of the diluent in a high pressure range stage and a low pressure range stage, separately collecting the vaporized diluent from the high pressure range stage, filtering the chilled mixture of wax, oil and remaining diluent in a filter provided with filter leaves to separate wax therefrom, subjecting the filter leaves to alternate high and low pressure to remove wax accumulated on said filter leaves and utilizing the vaporized diluent from the high pressure range stage to provide the high pressure in said aforementioned removal of wax accumulated on said filter leaves.

4. A method for dewaxing wax-oil mixtures which comprises commingling a wax-oil mixture with a liquefied normally gaseous diluent under superatmospheric pressure, chilling said commingled wax-oil mixture and diluent by vaporizing a portion of the diluent in a high pressure range stage and a low pressure range stage, separately collecting the vaporized diluent from the high pressure range stage, utilizing the vaporized diluent from the high pressure range stage to transfer the chilled mixture of wax, oil and remaining diluent to a filter and filtering said chilled mixture to separate wax therefrom under the influence of said vaporized diluent from the high pressure range stage.

BASIL HOPPER.
KENNETH KINGMAN.